United States Patent
Cha

(10) Patent No.: US 7,039,674 B1
(45) Date of Patent: May 2, 2006

(54) METHOD OF CHANGING PROGRAM OF NETWORK NODE REMOTE FROM NETWORK MANAGEMENT SYSTEM

(75) Inventor: Jeong-Ho Cha, Suwon-shi (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 736 days.

(21) Appl. No.: 09/615,613

(22) Filed: Jul. 14, 2000

(30) Foreign Application Priority Data

Jul. 14, 1999 (KR) ............................... 1999-28561

(51) Int. Cl.
*G06F 15/16* (2006.01)
*G06F 9/44* (2006.01)
*G06F 7/00* (2006.01)
*H40N 7/173* (2006.01)

(52) U.S. Cl. .................. 709/203; 725/92; 725/100; 725/115; 717/167; 707/104

(58) Field of Classification Search ................ 717/167; 370/403; 709/219, 234, 205; 707/104; 348/7
See application file for complete search history.

(56) References Cited

U.S. PATENT DOCUMENTS

| | | | | |
|---|---|---|---|---|
| 5,339,307 A | * | 8/1994 | Curtis | 370/445 |
| 5,557,317 A | * | 9/1996 | Nishio et al. | 725/92 |
| 5,585,854 A | * | 12/1996 | Makino | 358/407 |
| 5,701,491 A | * | 12/1997 | Dunn et al. | 717/167 |
| 5,805,824 A | * | 9/1998 | Kappe | 709/242 |
| 6,029,175 A | * | 2/2000 | Chow et al. | 707/104.1 |
| 6,031,818 A | * | 2/2000 | Lo et al. | 370/216 |
| 6,038,399 A | * | 3/2000 | Fisher et al. | 717/178 |
| 6,081,530 A | * | 6/2000 | Wiher et al. | 370/395.53 |

(Continued)

FOREIGN PATENT DOCUMENTS

JP 05158703 A * 6/1993

(Continued)

OTHER PUBLICATIONS

Lyndon Y. Ong□□Distributed Control of Multiparty, Multimedia Broadband Services□□Communications, 1991. ICC91, Conference Record. IEEE International Conference on, Jun. 23-26, 1991.*

*Primary Examiner*—Bunjob Jaroenchonwanit
*Assistant Examiner*—Chad Zhong
(74) *Attorney, Agent, or Firm*—Cha & Reiter, L.L.C.

(57) ABSTRACT

A program-changing method for a network having at least two nodes that include a first and a second predetermined node, each network node having a program, includes a network management system connected to the first predetermined node of the network. New changing program data and a control signal are transmitted to the first predetermined node connected to the network management system which is disposed in the network separately from the nodes and configured to manage the changing of the programs in the nodes. The first predetermined node replaces its program with the new changing program data. The network management system transmits a program-transmitting-signal to the first predetermined node, causing the transmission of the newly changed program data stored therein to the next predetermined node to change the program of the next predetermined node under control of a respective control signal to the second predetermined node from the network management system.

21 Claims, 2 Drawing Sheets

U.S. PATENT DOCUMENTS

| | | | |
|---|---|---|---|
| 6,157,650 A * | 12/2000 | Okuyama et al. | 370/401 |
| 6,253,240 B1 * | 6/2001 | Axberg et al. | 709/223 |
| 6,301,508 B1 * | 10/2001 | Matsuura | 700/3 |
| 6,360,264 B1 * | 3/2002 | Rom | 709/227 |
| 6,601,086 B1 * | 7/2003 | Howard et al. | 709/203 |
| 6,772,209 B1 * | 8/2004 | Chernock et al. | 709/225 |
| 6,801,949 B1 * | 10/2004 | Bruck et al. | 709/232 |

FOREIGN PATENT DOCUMENTS

| | | | |
|---|---|---|---|
| JP | 06085939 A | * | 3/1994 |
| JP | 07168771 A | * | 7/1995 |
| JP | 07295943 A | * | 11/1995 |
| JP | 11184702 A | * | 7/1999 |
| JP | 2000067021 A | * | 3/2000 |

* cited by examiner

METHOD OF CHANGING PROGRAM OF NETWORK NODE REMOTE FROM NETWORK MANAGEMENT SYSTEM

CLAIM OF PRIORITY

This application makes reference to and claims all benefits accruing under 35 U.S.C. Section 119 from an application for METHOD OF CHANGING PROGRAM OF REMOTE NODE 1N NETWORK filed earlier in the Korean Industrial Property Office on Jul. 14, 1999 and there duly assigned Serial No. 28561/1999.

BACKGROUND OF THE INVENTION

1. Field of the Invention

The present invention relates to a method for changing the program of each transmission system constituting a network, and more particularly to a method for changing the program of each transmission system in a remote place.

2. Description of the Related Art

In general, a communication network basically includes a plurality of nodes with a switching function being connected via transmission paths to communication terminals. A group of systems is configured in such a manner to build a network. This network includes an exchange network allowing a plurality of switching systems to be connected to each other, a transmission network allowing a plurality of transmission systems to be connected to each other, a network allowing a plurality of external terminals such as personal computers (PCs) to be connected to each other within a specific region via a local area network (LAN), and an Internet network allowing a plurality of remote computers to be accessed to communicate with each other over the Internet.

In building a network as mentioned above, the network is classified into a variety of types depending on the characteristics of the networks. The name of the networks also varies based on the constituting elements of each of the networks. Further, the network is configured in such a manner that a network management system for the maintenance and repair of network is provided to centrally control these networks. The scope of the network is represented by a combination of nodes and links representing a network topology. There are two types of methods in implementing a network: (1) a method for implementing a network by using a loop-shaped network topology; and, (2) a method for implementing a network by using a linear-shaped network topology.

FIG. 1 is a schematic view illustrating the flow stream of data and control signals for changing the program in the loop-shaped transmission network according to the prior art.

A process for changing the program in the loop-shaped transmission network will be described in detail hereinafter with reference to FIG. 1. In FIG. 1, each of transmission systems constituting the transmission network forms one node, respectively. Namely, a transmission system, i.e., a Network Element 1 (hereinafter referred as "NE 1 (21)") forming a first node is connected to a transmission system, i.e., a Network Element 2 (hereinafter referred as "NE 2 (22)") forming a second western node. The NE 1 is connected to a transmission system, i.e., a Network Element 3 (hereinafter referred as "NE 3 (23)") forming a third eastern node. Also, a transmission system, i.e., a Network Element 4 (hereinafter referred as "NE 4 (24)") forming a fourth northern node is coupled between the NE 2 (22) and NE 3 (23). A Network Management System 10 (hereinafter referred as "NMS") is connected to the NE 1 (21).

According to the above configuration, if the NMS 10 attempts to change the program for each of the nodes (21), (22), (23), and (24) arranged in the loop-shaped transmission network, the program of the NE 1(21) is changed first. To this end, the NMS 10 transmits a control signal, indicated by a dotted line in FIG. 1, and the new program to the NE 1 (21). After the program of the NE 1 (21) is changed into the new program transmitted from the NMS 10. The NMS 10 transmits the new program and the control signal to the NE 2 (22) via the NE 1 (21), so that the program of the NE 2 (22) can be also changed to the new program. Similarly, the NMS 10 transmits the new program and the control signal to the NE 3 (23) via the NE 1 (21), so that the program of the NE 3 (23) is changed into the new program. Then, the NMS 10 transmits the new program data and the control signal to the NE 4 (24) via the NE 1 (21) and the NE 2 (22), or the NE 1 (21) and the NE 3 (23) so that the program of the NE 4 (24) is changed into the new program.

Accordingly, if data representing the new changing program is transmitted to each of the nodes (21), (22), (23) and (24), a great deal of traffic for the data transmission of the new changing program and the control signal is generated between the NMS 10 and the NE 1 (21), between the NE 1 (21) and the NE 2 (22), or between the NE 1 (21) and the NE 3 (23). Thus, the number of traffic hops for each of the nodes in the loop-shaped transmission network can be expressed by the following [formula 1]:

$$H=(N+3)\times N+1, \text{ (if } N \text{ is an odd number);}$$

$$H=(N+2)\times N, \text{ (if } N \text{ is an even number),} \qquad \text{[formula 1]}$$

wherein H is the number of traffic hops and N is the number of nodes (transmission systems) arranged in the loop-shaped transmission network. As the number of nodes increases, the number of traffic hops also increases, thereby degrading the transmission efficiency in the loop-shaped transmission network.

FIG. 2 is a schematic view illustrating the flow stream of data and control signals for changing the program in a linear-shaped transmission network according to the prior art.

A process for changing the program in the linear-shaped transmission network will be described in detail hereinafter with reference to FIG. 2. In FIG. 2, an NMS 10 is connected to a transmission system, i.e., NE 1 (21) forming a first node, which is connected to a transmission system, i.e., NE 2 (22) forming a second node, which is also connected to a transmission system, i.e., NE 3 (23) forming a third node. In the event that the NMS 10 attempts to change the program of each of the nodes (21), (22), (23) and (24) arranged in the linear-shaped transmission network, the program of the NE 1 (21) first should be changed. Thus, the NMS 10 transmits the control signal, indicated by a dotted line in FIG. 2, along with data representing the new program to the NE 1 (21). In this manner, after the program of the NE 1 (21) is changed to the new program data transmitted from the NMS 10, the NMS 10 transmits the new program data and the control signal to the NE 2 (22) via the NE 1 (21), so that the program of the NE 2 (22) is also changed to the new program. Similarly, the NMS 10 transmits the new program data and the control signal to the NE 3 (23) via the NE 1 (21) and the NE 2 (22), so that the program of the NE 3 (23) is changed to the new program. Through this process, the program of transmission system forming each node is changed to the new program. Accordingly, the number of traffic hops of the nodes of the linear-shaped transmission network can be expressed by the following [formula 1]:

$$H = \frac{\{N + (N+1)\}}{2} \quad \text{[formula 1]}$$

wherein H is the number of traffic hops, and N is the number of nodes (transmission systems) arranged in the linear-shaped transmission network. Therefore, as the number of nodes increases as in the case of loop-shaped transmission network, the number of traffic hops increases, thereby degrading transmission efficiency in the linear-shaped transmission network.

The networking architecture arranged in the loop-shaped transmission network and linear-shaped transmission network as mentioned-above is configured in such a manner that, if the NMS 10 attempts to change the program of each of the nodes (21), (22), (23), and (24) constituting the transmission network in a remote place, the NMS 10 centrally transmits the new program data and the control signal to each node, resulting in an increase in the number of traffic hops and thereby degrading the transmission efficiency in the transmission networks.

SUMMARY OF THE INVENTION

Therefore, an object of the invention is to provide a method for changing the program of each transmission system or node constituting a network by arranging the traffic flow to reduce the number of traffic hops, so that the time required for changing the program of each transmission system within the network can be reduced.

In accordance with the embodiment of the present invention, the present invention provides a method for changing the program of each node constituting a network in a remote place, wherein the network including at least two nodes and a network management system connected to the predetermined nodes of the network, the method comprising the steps of:

transmitting new changing program data and a control signal to the predetermined nodes connected to the network management system, wherein the predetermined node constitutes the network and the control signal being adapted to change the program of the predetermined node;

allocating a fixed region in a memory within a transmission system forming one of the predetermined nodes in response to the reception of the new changing program data and storing the new changing program data in the fixed region after changing the program of one of the predetermined node with the new changing program data under the control of the control signal;

allowing the network management system to transmit a command signal or a program-transmitting signal to one of the predetermined node and simultaneously allowing the network management system to transmit the control signal to the next predetermined node; and, in response to the command signal or the program-transmitting signal, allowing one of the predetermined nodes to transmit the newly changing program data thereof to the next predetermined node and replacing the program of the next predetermined node with the new changing program transmitted from one of the predetermined nodes, under the control of the control signal received from the network management system.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 1:
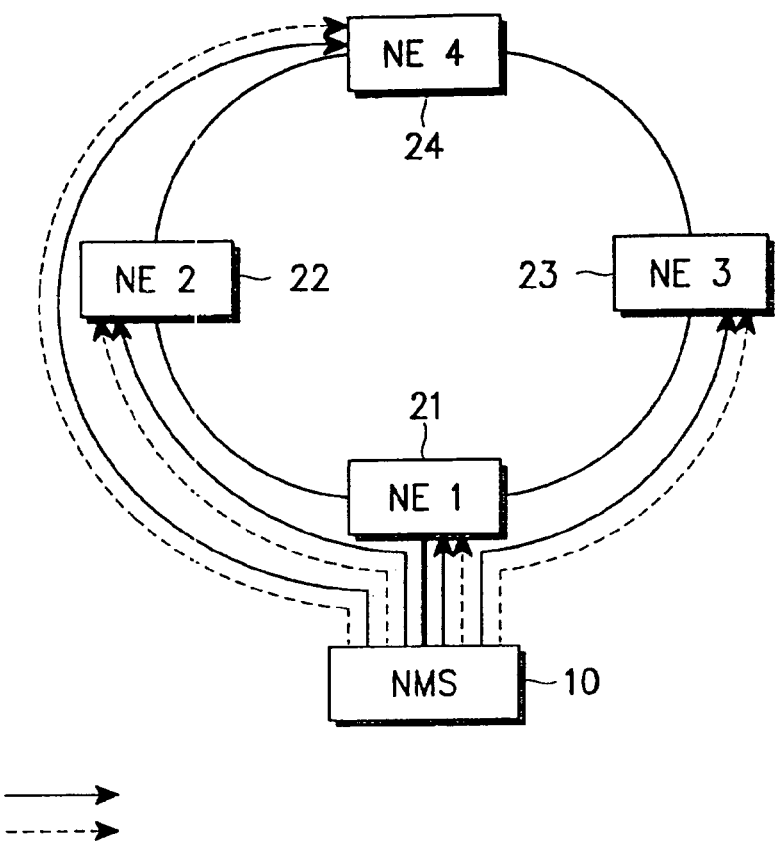
FIG. 1 is a schematic view illustrating the flow stream of data and control signals for changing the program in a loop-shaped transmission network in accordance with the prior art.
Figure 2:
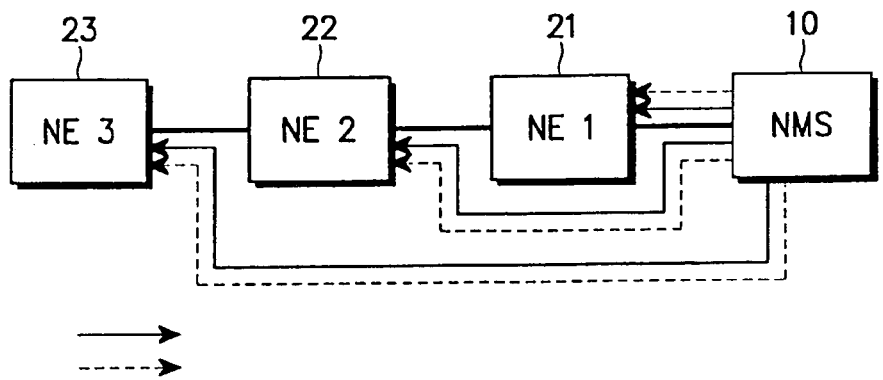
FIG. 2 is a schematic view illustrating the flow stream of data and control signals for changing the program in a linear-shaped transmission network in accordance with the prior art.

A reference will now be made in greater detail to the preferred embodiments of the present invention. In the drawings, the same or similar elements are denoted by the same reference numerals even though they are depicted in different drawings. For the purpose of clarity, a detailed description of well-known functions and configurations incorporated herein will be omitted as they may make the subject matter of the present invention unclear.

Figure 3:
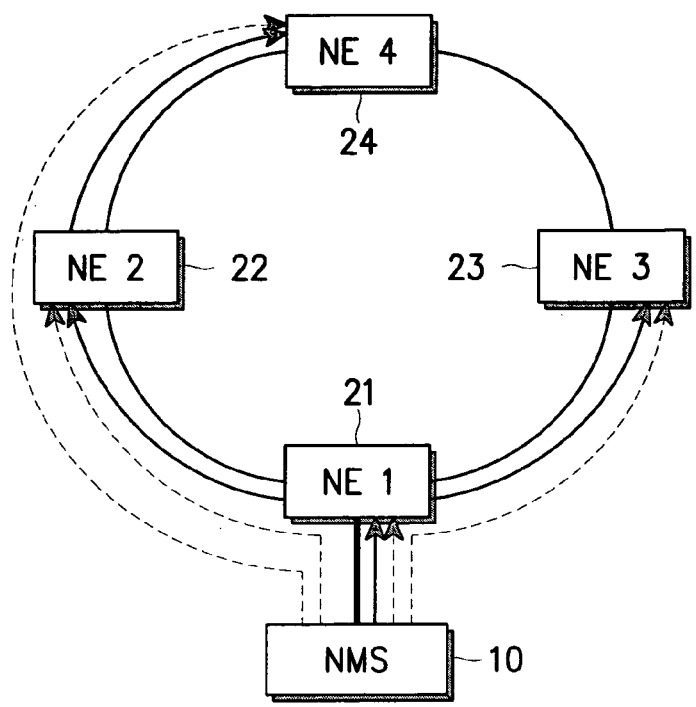
FIG. 3 is a schematic view illustrating the stream of data and control signals for changing the program in a loop-shaped transmission network according to the preferred embodiment of the present invention; and, FIG. 4 is a schematic view illustrating the flow stream of data and control signals for changing the program in a linear-shaped transmission network according to the preferred embodiment of the present invention.

FIG. 3 is a schematic view illustrating the flow stream of data and control signals for changing the program in a loop-shaped transmission network according to the preferred embodiment of the present invention.

The process for changing the program in the loop-shaped transmission network of the present invention and the flow stream of data and control signals will be described in detail hereinafter with reference to FIG. 3.

In FIG. 3, each of the transmission system constituting the transmission network forms one node, respectively. A transmission system, i.e., a Network Element 1 (hereinafter referred as "NE 1 (21)") forming a first node is connected to a transmission system, i.e., a Network Element 2 (hereinafter referred as "NE 2 (22)") forming a second western node, which is connected to a transmission system, i.e., a Network Element 3 (hereinafter referred as "NE 3 (23)") forming a third eastern node. Also, a transmission system, i.e., a Network Element 4 (hereinafter referred as "NE 4 (24)") forming a fourth northern node is disposed between the NE 2 (22) and NE 3 (23). Further, a Network Management System 10 (hereinafter referred as "NMS") is connected to the NE 1 (21). Now, the process for changing the program in the loop-shaped transmission network of the present invention will be described in detail hereinafter with reference to FIG. 3.

In the event that the NMS 10 attempts to change the program of each of the nodes (21), (22), (23) and (24) arranged in the loop-shaped transmission network, the program of the NE 1 (21) is initially changed. Thus, the NMS 10 transmits a new changing program data along with a control signal in order to change the program of the NE 1(21). In the following description, the control signal transmitted from the NMS 10 to change the program of each node is referred as "a program data-changing signal". When the NE 1 (21) receives the "data-changing signal" and the new changing program data from the NMS 10, the new changing program data is stored in the memory included within the NE 1 (21), then the program in the NE 1 (21) is changed under the control of the "data-changing signal" transmitted from the NMS 10. Accordingly, the program of the NE 1 (21) is changed to the new changing program data. When the program of the NE 1 (21) is changed, the NMS 10 transmits a command signal to the NE 1 (21) indicating that the NE 1 (21) should transmit the newly changed program data stored thereon to the NE 2 (22) in order to change the program of the NE 2 as well as the "data-changing signal" to the NE 2 (22). In the following description, the command signal dictating that the predetermined node, i.e., the NE 1 (21), should transmit the newly changed program data stored therein to other predetermined node, i.e., the NE 2 (22), is referred to as "a data-transmitting signal". The "data-changing signal" transmitted from the NMS 10 to the NE 1 (21) is transmitted to the NE 2 (22) via the NE 1 (21). Then, the data-transmitting signal outputted from the NMS 10 is transmitted to the NE 1 (21) so that the NE 1 (21) transmits the newly changed program data stored in the memory thereof to the NE 2 (22). Through this process, the NMS 10 can change the program data of the NE 2 (22) using the newly changed program data stored in the memory of the NE 1 (21). That is, the newly changed program data stored in the memory of the NE 1 (21) is directly transmitted to the NE 2 (22), instead of being transmitted from the NMS 10 to the NE2 (22) via the NE 1 (21) as in the prior art, thereby reducing the number of the traffic hops. For the NE 3 (23) and the NE 4 (24), the process of changing program data of the NE 3 (23) and the NE 4 (24) can also be performed through the above-mentioned process. Accordingly, when the program of the transmission system forming each node is changed to the new changing program data as explain above, the number of traffic hops of the nodes arranged in the loop-shaped transmission network can be expressed by the following [formula 3]:

$$H=N+1,\qquad\text{[formula 3]}$$

wherein H is the number of traffic hops and N is the number of nodes (transmission systems) arranged in the loop-shaped transmission network.

Figure 4:
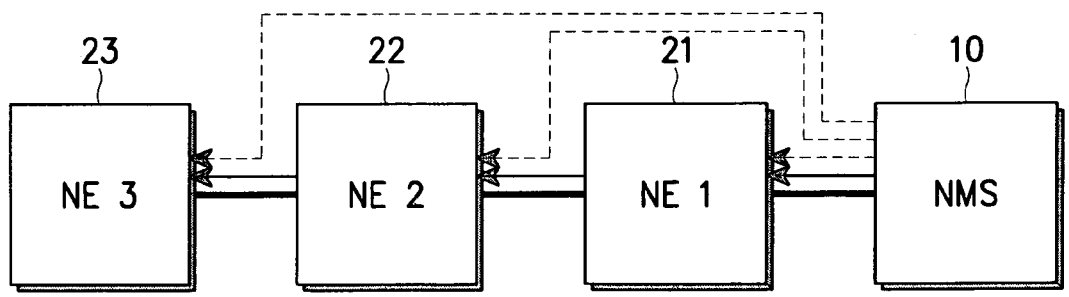

FIG. 4 is a schematic view illustrating the flow stream of data and control signals for changing the program in a linear-shaped transmission network according to the preferred embodiment of the present invention.

A process for changing the program and the flow stream of control signal arranged in the linear-shaped transmission network will be described in detail hereinafter with reference to FIG. 4.

The NMS 10 is connected to a transmission system, i.e., NE 1 (21) forming a first node, which is connected to a transmission system, i.e., NE 2 (22) forming a second node, which is also connected to a transmission system, i.e., NE 3 (23) forming a third node. In the event that the NMS 10 attempts to change the program of each node (21), (22), (23), and (24) arranged in the linear-shaped transmission network, the program of the NE 1 (21) is initially changed. Accordingly, the NMS 10 transmits the "data-changing signal" along with the new changing program data to the NE 1 (21). Then, the new changing program data received by the NE 1 (21) is stored in a fixed memory of the NE 1 (21) and the program of the NE 1 (21) is changed to the new changing program data under the control of the "data-changing signal." In this manner, after the program of the NE 1 (21) is changed to the new changing program data transmitted from the NMS 10, the NMS 10 transmits a "program-transmitting signal," or a command signal to the NE 1 (21), dictating the NE 1 (21) to transmit the newly changed program data stored therein to the NE 2 (22) in order to change the program of the NE 2, while transmitting the "data-changing signal" to the NE 2 (22).

Accordingly, when the NE 1 (21) receives the "program-transmitting signal" from the NMS 10, the newly changed program data stored in the memory of the NE 1 (21) is transmitted to the NE 2 (22). Through this process, if the NMS 10 changes the old program data of the NE 2 (22) with the new changing program data, the NMS 10 dictates the NE 1 (21) to transmit the newly changed program data stored in the memory thereof to the NE 2 (22). Thus, the program of the NE 2 (22) can be changed to the new changing program data by having the NMS (21) to transmit the new changing program data stored therein directly to the NE 2 (22), thereby reducing the number of the traffic hops. Also, the process of changing the program data of the NE 2 (22) is identical to the process of changing the program data of the NE 1 (21). Further, the process of changing the program data of the NE 3 (23) can also be performed in similar steps as mentioned in the above process. Accordingly, when the program of a transmission system forming each node is changed to the new changing program data, the number of traffic hops of the nodes arranged in the linear-shaped transmission network can also be expressed by the above-mentioned [formula 3].

As described above, the program changing method of the present invention provides an advantage that in the case where the program of a node forming a network is changed, the newly changed program data is stored in the node. Then, the stored newly changed program data is transmitted to another node to change the program in the other node, thereby significantly reducing the amount of traffic in the network.

While this invention has been described in connection with what is presently considered to be the most practical and the preferred embodiment, it is to be understood that the invention is not limited to the disclosed embodiment; on the contrary, it is intended to cover various modifications within the spirit and the scope of the appended claims.

What is claimed is:

1. A program-changing method for a network comprising at least two nodes that each have a program, said network further comprising a network management system (NMS) coupled to a first node of the nodes, the method comprising the steps of:

(a) transmitting, by the network management system (NMS), a new program data and a first control signal to said first node coupled to the network management system (NMS) disposed in the network separately from the nodes and configured to manage the changing of the programs of the nodes;

(b) allocating a fixed region in a memory within said first node in response to the reception of the new program data, storing the received new program data in the allocated fixed region, and replacing the program of said first node coupled to the network management system (NMS) with the new program data responsive to the first control signal;

(c) causing the network management system (NMS) to transmit to said first node a data-transmitting signal for transmitting the stored new program data to a second node, and transmitting, by the network management system (NMS), a second control signal to said second node for program-changing; and (d) in response to the data-transmitting signal, causing said first node to transmit the stored new program data thereof to said second node for program-changing.

2. The method as set forth in claim 1, wherein the method further comprising the step of (e) replacing the program of said second node with the new program data received from said first node responsive to the second control signal and the step of (f) transmitting by the network management system (NMS) a data-transmitting signal to the second node for transmitting a new program data to a next node coupled to the second node.

3. The method as set forth in claim 2, wherein said nodes are arranged in a straight line or a loop in said network.

4. A program-changing method for a network comprising a plurality of nodes including a first node and a second node, each of the first and second nodes having a program, the method comprising the steps of:

(a) transmitting a new program data and a first control signal to the first node, said first node being coupled to a network management system (NMS) located in the network remotely from the plural nodes;

(b) changing the program of said first node to said new program data under the control of said control signal;

(c) storing said new program data in a memory means of said first node;

(d) transmitting, by said NMS and to said first node, a first command signal to transmit the stored new program data to the second node and transmitting a second control signal to said second node; and, (e) upon receiving said stored new program data from said first node, changing the program of said second node to said new program data under the control of said second control signal.

5. The method as set forth in claim 4, wherein the plural nodes are arranged in a straight line or a loop in said network.

6. The method as set forth in claim 4, wherein the plural nodes further include a remaining node, said method further comprising the steps of:

(f) storing said new program data received from said first node in a memory means of said second node;

(g) transmitting, by said NMS, a second command signal to said second node to transmit said stored new program data in said second node to said remaining node and transmitting a third control signal to said remaining node; and (h) upon receiving said stored new program data from said second node, changing the program of said remaining node to said new program data under the control of said third control signal.

7. The method as set forth in claim 4, wherein the plural nodes include a third node having a program, said method further comprising the step of repeating the steps (c), (d), and (e) for changing the program in said third node in an iteration in which said second node of a previous iteration becomes said first node, the third node becomes said second node, a second command signal becomes said first command signal, and a third control signal becomes said second control signal.

8. A program-changing method for a plurality of nodes that each have a program, said nodes being arranged in a network having a network management system (NMS) remote from the plural nodes and coupled to one of the plural nodes, the method comprising the steps of:

(a) transmitting a new program data and a first control signal to the one of the plural nodes coupled to said network management system (NMS) which is disposed in the network separately from the plural nodes;

(b) storing said new program data in a memory means of the one node;

(c) changing the program of said one node to said new program data under the control of said first control signal;

(d) transmitting, by said NMS to said one node, a first command signal to transmit the stored new program data to another of the plural nodes and transmitting a second control signal to the another node; and (e) upon receiving said stored new program data, changing the program of said another node to said new program data under the control of said second control signal.

9. The method as set forth in claim 8, further comprising the step of repeating the steps (b), (c), (d) and (e) in an iteration in which said another node of a previous iteration becomes said one node, a third control signal becomes said second control signal, and a second command signal becomes said first command signal.

10. The method as set forth in claim 8, wherein a node of said plural nodes other than said one or said another node remains, said method further comprising the steps of:

(f) transmitting, by said NMS, another command signal to transmit said stored new program data in said another node to the remaining one of the plural nodes and transmitting a third control signal to that remaining node;

(g) in response to said another command signal, storing said new program data from said another node in a memory means of said remaining node;

(h) upon receiving said stored new program data from said another node, changing the program of said remaining node to said new program data under the control of said third control signal.

11. The method as set forth in claim 8, wherein the plural nodes are arranged in a straight line or a loop in said network.

12. The method of claim 1, wherein the programs of each of the nodes are identical.

13. The method of claim 7, wherein each remaining one of the plural nodes has a program which is updated in a respective additional iteration of the steps c), d) and e) for a current one of the plural nodes by means of a current control signal, wherein said second node of a previous iteration becomes said first node, the current node becomes said second node, a second command signal becomes said first command signal, and the current control signal becomes said second control signal.

14. The method as set forth in claim 2, said method further comprising the steps of:

(g) transmitting, by said NMS, a third control signal to said next node; and (h) replacing, by said next node, the program of said next node with the new program data received from said second node responsive to said third control signal to said next node.

15. The method as set forth in claim 14, wherein said second node is disposed in said network between said first node and said next node, and wherein said new program data received from said first node is received from said second node.

16. The method as set forth in claim 14, wherein said first node has plural output paths on said network, and wherein said new program data received from said first node is received by said next node on a path different from that on which is transmitted said stored new program data thereof to said second node.

17. A program-changing method for a network that includes a plurality of nodes and, connected to a node of the plural nodes, a Network Management System (NMS), the plural nodes being connected in a particular formation, said method comprising the steps of:

transmitting a new program, from the NMS, to a first node of the plural nodes; and iteratively propagating the new program forward along said formation from said first node to a second node, from the standpoint of inter-node hops on said formation, is an immediately neighboring node of corresponding said first node such that the second node and receives the new program, and receives said new program exactly once, each of said inter-node hops of the propagation being controlled by the NMS, wherein the NMS exercises the control by issuing two types of signals, one of the types being a program-changing signal that commands a first node of the plurality of nodes to, by storing at a fixed, allocated portion of memory at said first node, replace, with the new program, a program stored in said memory of said first node, the other type being a data-transmitting signal that commands said first node to retrieve the new program from said memory and to transmit the retrieved program to a second node immediately neighboring the first node.

18. The program-changing method as claimed in claim 17, wherein said node of the plural nodes has a plurality of output paths along said formation and transmits said new program along more than one of the plural output paths.

19. The program-changing method as claimed in claim 17, wherein said plurality of nodes includes at least four nodes.

20. The program-changing method as claimed in claim 17, wherein the NMS is disposed remotely from the plural nodes.

21. The program-changing method as claimed in claim 17, wherein the particular formation is a ring or a single line.

* * * * *